(12) United States Patent
Wang

(10) Patent No.: US 12,291,782 B2
(45) Date of Patent: May 6, 2025

(54) COMPONENT HAVING IMPROVED SURFACE CONTACT RESISTANCE AND REACTION ACTIVITY AND METHODS OF MAKING THE SAME

(71) Applicant: Treadstone Technologies, Inc., Princeton, NJ (US)

(72) Inventor: Conghua Wang, West Windsor, NJ (US)

(73) Assignee: TREADSTONE TECHNOLOGIES, INC., Princeton, NJ (US)

( * ) Notice: Subject to any disclaimer, the term of this patent is extended or adjusted under 35 U.S.C. 154(b) by 0 days.

(21) Appl. No.: 18/524,424

(22) Filed: Nov. 30, 2023

(65) Prior Publication Data
US 2024/0093377 A1 Mar. 21, 2024

Related U.S. Application Data

(63) Continuation of application No. 17/183,502, filed on Feb. 24, 2021, now Pat. No. 11,885,026.
(Continued)

(51) Int. Cl.
| | |
|---|---|
| *C23C 24/08* | (2006.01) |
| *C25B 11/036* | (2021.01) |
| *H01M 8/0228* | (2016.01) |

(52) U.S. Cl.
CPC .......... *C23C 24/085* (2013.01); *C25B 11/036* (2021.01); *H01M 8/0228* (2013.01)

(58) Field of Classification Search
CPC ....... C23C 24/085; C25B 11/036; C25B 9/75; C25B 11/02; H01M 8/0228; H01M 8/0206; H01M 8/0215; Y02E 60/50
See application file for complete search history.

(56) References Cited

U.S. PATENT DOCUMENTS

| | | |
|---|---|---|
| 4,460,666 A | 7/1984 | Dinkler et al. |
| 5,268,045 A | 12/1993 | Clare |
| (Continued) | | |

FOREIGN PATENT DOCUMENTS

| | | | |
|---|---|---|---|
| CN | 108808028 A | * | 11/2018 |
| EP | 2642571 A1 | | 9/2013 |
| (Continued) | | | |

OTHER PUBLICATIONS

Department of Energy (DOE) Hydrogen and Fuel Cell Technologies Office's Multi-Year Research, Development, and Demonstration Plan, 2016 Fuel Cells Section, pp. 3.4-1-3.4-58.
(Continued)

*Primary Examiner* — Jacob M Amick
*Assistant Examiner* — Charles J Brauch
(74) *Attorney, Agent, or Firm* — CANTOR COLBURN LLP

(57) ABSTRACT

A component for an electrochemical device, the component including: a metallic substrate; and a plurality of particles bonded to a surface of the substrate by a metallurgical bond, wherein the particles include a metal, carbon, or a combination thereof, wherein the metallurgical bond is between the particles and the substrate, wherein a total projected area of the metallurgical bond is less than 90% of a total projected area of the substrate, and wherein the metallurgical bond has a composition which is a combination of a composition of the metallic substrate and a composition of the particle, a reaction product of the metallic substrate and the particle, or a combination thereof.

20 Claims, 5 Drawing Sheets

Related U.S. Application Data

(60) Provisional application No. 62/981,879, filed on Feb. 26, 2020.

(56) References Cited

U.S. PATENT DOCUMENTS

| | | | | |
|---|---|---|---|---|
| 6,528,201 | B1 * | 3/2003 | Hitomi | H01M 4/8842 429/506 |
| 10,435,782 | B2 | 10/2019 | Wang et al. | |
| 2004/0101738 | A1 | 5/2004 | Tawfik et al. | |
| 2009/0176120 | A1 | 7/2009 | Wang | |
| 2011/0076587 | A1 | 3/2011 | Wang et al. | |
| 2013/0011736 | A1 | 1/2013 | Loveness et al. | |
| 2013/0309591 | A1 * | 11/2013 | Huang | C04B 38/0045 429/452 |
| 2016/0305011 | A1 | 10/2016 | Wang et al. | |
| 2017/0284287 | A1 * | 10/2017 | Nathamani | F02M 21/0206 |
| 2018/0309136 | A1 | 10/2018 | Vieluf et al. | |

FOREIGN PATENT DOCUMENTS

| | | | |
|---|---|---|---|
| JP | 9283115 | A | 10/1997 |
| JP | 2008077999 | A * | 4/2008 |
| JP | 201177018 | A | 4/2011 |
| WO | 0069003 | A2 | 11/2000 |
| WO | 2013126883 | A1 | 8/2013 |

OTHER PUBLICATIONS

EP SR issued Oct. 11, 2022.
Extended European Search Report, European Application No. 21761884, dated Oct. 11, 2022, 10 pages.
International Search Report for International Application No. PCT/US2021/019315; Application Filing Date: Feb. 24, 2021; Date of Mailing: Jun. 1, 2021; 3 pages.
IPRP, Mailed Sep. 9, 2022.
ISR/WO, Mailed Jun. 1, 2021.
Written Opinion for International Application No. PCT/US2021/019315; Application Filing Date: Feb. 24, 2021; Date of Mailing: Jun. 1, 2021; 6 pages.

* cited by examiner

COMPONENT HAVING IMPROVED SURFACE CONTACT RESISTANCE AND REACTION ACTIVITY AND METHODS OF MAKING THE SAME

CROSS-REFERENCE TO RELATED APPLICATIONS

This application is a continuation application of application Ser. No. 17/183,502, filed Feb. 24, 2021, which claims priority to U.S. Provisional Application No. 62/981,879 filed on Feb. 26, 2020, and all the benefits accruing therefrom under 35 U.S.C. § 119, the contents of which are incorporated by reference in their entirety.

BACKGROUND

(1) Field

Disclosed is a component having reduced surface electrical contact resistance, improved electrode reaction activity, and methods of making the same. The component may be a bipolar plate or an electrode for a battery, fuel cell, or an electrolyzer, for example.

(2) Description of the Related Art

In fuel cell, flow battery, or electrolyzer applications a bipolar plate is used as to join adjacent cells. The bipolar plate desirably provides low surface contact resistance and strong corrosion resistance to minimize internal ohmic loss, and maintain the lifetime operational stability. In an electrolyzer or flow battery, an electrode having high reaction activity is desired to for efficient electrode reactions. There remains a need for improved components, e.g., a bipolar plate, that provides improved combination of contact resistance and corrosion resistance, or an electrode, that has high reaction activity.

SUMMARY

Disclosed is a component for an electrochemical device, the component including: a metallic substrate; and a plurality of particles bonded to a surface of the substrate by a metallurgical bond, wherein the particles include a metal, carbon, or a combination thereof, wherein the metallurgical bond is between the particles and the substrate, wherein a total projected area of the metallurgical bond is less than 90% of a total projected area of the substrate, and wherein the metallurgical bond has a composition which is a combination of a composition of the metallic substrate and a composition of the particle, a reaction product of the metallic substrate and the particle, or a combination thereof.

Also disclosed is a method of manufacturing a component for an electrochemical device, the method including: providing a metallic substrate; disposing a composition including a plurality of precursor particles on the metallic substrate, wherein the precursor particles include a metal, carbon, metal hydride or a combination thereof, to provide a coated substrate, wherein the precursor particles contact less than 90% of a total projected area of the substrate, and wherein the precursor particles have an average particle size of less than 200 μm; and heat-treating the coated substrate to form particles from the precursor particles, and bond the particles to the substrate by a metallurgical bond formed between the particles and the metallic substrate to manufacture the component, wherein the metallurgical bond has a composition which is a combination of a composition of the metallic substrate and a composition of the particle, a reaction product of the substrate and the particle, or a combination thereof.

BRIEF DESCRIPTION OF THE DRAWINGS

The above and other advantages and features of this disclosure will become more apparent by describing in further detail embodiments thereof with reference to the accompanying drawings, in which.

DETAILED DESCRIPTION

Figure 1:
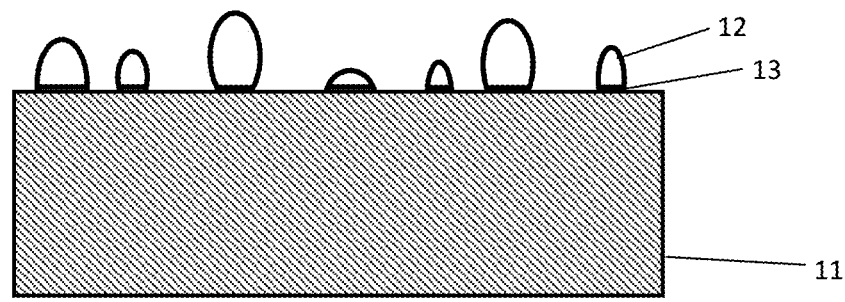
FIG. 1 is a schematic cross-sectional view of a substrate including particles metallurgically bonded to the substrate.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In a fuel cell, flow battery, or electrolyzer stack, a component, e.g., a bipolar plate, is provided between adjacent cells to electrically connect the cells and separate reactants in the adjacent cells. The bipolar plate is in electrical contact with other components in the stack, such as a mass transport layer, or an electrode. However, solid to solid surface contact is only on the high points of the surface. As a result, the number of contact points or the contacting area is limited, which results in the high surface electrical or thermal contact resistance. An approach to reduce surface contact resistance is to use a soft material on the contacting surface. The soft material can be deformed under pressure, to match the surface morphology of the contacting component, which increases the actual contacting area between two components. Representative soft materials to enhance electrical or thermal contact include silver, gold, or tin. However, such soft materials are either too expensive or do not provide suitable chemical stability or corrosion resistance for electrochemical devices such as fuel cells are electrolyzers.

U.S. Pat. No. 10,435,782 discloses modifying surface morphology to provide a micro-textured structure of corrosion resistant materials to reduce electrical contact resistance. The micro-textured surface structure increases the actual contact area between components by the deformation of the micro-textured structure under compression pressure, resulting in the low contact resistance. However, development of a low cost, rapid manufacturing process to provide such micro-textured structures for high volume production has proven to be difficult. Similarly, use of a pulsed laser to provide micro- or nanoscale surface structures has proven to be too slow and expensive for commercial application.

U.S. patent application 2018/0309136 teaches mechanically bonding particles to a substrate using electrostatic force in vacuum. Further evaluation found that the mechanically bonded interface between the particles and the substrate is vulnerable to corrosion along the interface, which ultimately resulted in the failure of the bond.

Adhesive bonding and brazing have also been considered, however it has been found that the resulting bond does not provide suitable corrosion resistance for electrochemical applications. Diffusion bonding, in which components are pressed together at high pressure and at high temperature, has also been considered. However diffusion bonding has proven to be expensive and is not provide suitable corrosion resistance.

In electrolyzer or flow battery, electrode activity can affect power and efficiency. The normal approach to increase the reaction activity is to use high active material and increase the surface area. Due to the high corrosive operational environment in electrochemical devices, improved bonding between the electrode reaction active material and electrode substrate, typically a metal, is desired to maintain the long term electrode durability.

The inventor has surprisingly discovered that if particles are bonded to a metallic substrate by a metallurgical bond, a component, e.g., bipolar plate, can be provided having an improved combination of contact resistance, reaction activity and corrosion resistance, while providing improved performance for electrochemical applications, such as in a fuel cell, flow battery, or electrolyzer.

Disclosed is a component for an electrochemical device, the component comprising: a metallic substrate; and a plurality of particles bonded to a surface of the substrate by a metallurgical bond, wherein the particles comprise a metal, carbon, or a combination thereof, wherein the metallurgical bond is between the particles and the substrate, wherein a total projected area of the metallurgical bond is less than 90% of a total projected area of the substrate, and wherein the metallurgical bond has a composition which is a combination of a composition of the metallic substrate and a composition of the particle, a reaction product of the metallic substrate and the particle, or a combination thereof.

An aspect of the disclosed component is shown in FIG. 1, which illustrates the metallic substrate 11, and the particles 12 bonded to the metallic substrate by a metallurgical bond 13. In an aspect, the metallurgical bonding can form between particles in addition to metallurgical bonding between particles and the substrate.

The metallic substrate may comprise Ti, Nb, Ta, Ni, Cr, an alloy thereof, stainless steel, or a combination thereof. Use of Ti or stainless steel, e.g., 316 or 304 stainless steel is mentioned. The metallic substrate may have any suitable form and may fully dense or porous, and may be in the form of a film, a foil, a screen, a mesh, a perforated film, an expanded metal foil, or a microporous sheet.

In an aspect, an expanded metal, mesh, perforated metal or screen may be used as the substrate. The substrate may have an open area of 10% to 90%, 20% to 80%, 30% to 70%, or 40% to 60%, of a total projected area of the substrate. Multiple layers of the foregoing may be used, e.g., to provide a multilayered substrate or a structure or composition gradient. Use of a titanium felt, or a titanium sinter is mentioned. In an aspect, a microporous sheet may be used, and the porosity may be 30% to 95%, 40% to 90%, 50% to 85%, or 55% to 80%, based on a volume of the substrate. Any suitable combination of the upper and lower limits of the foregoing ranges may be used.

Figure 11:
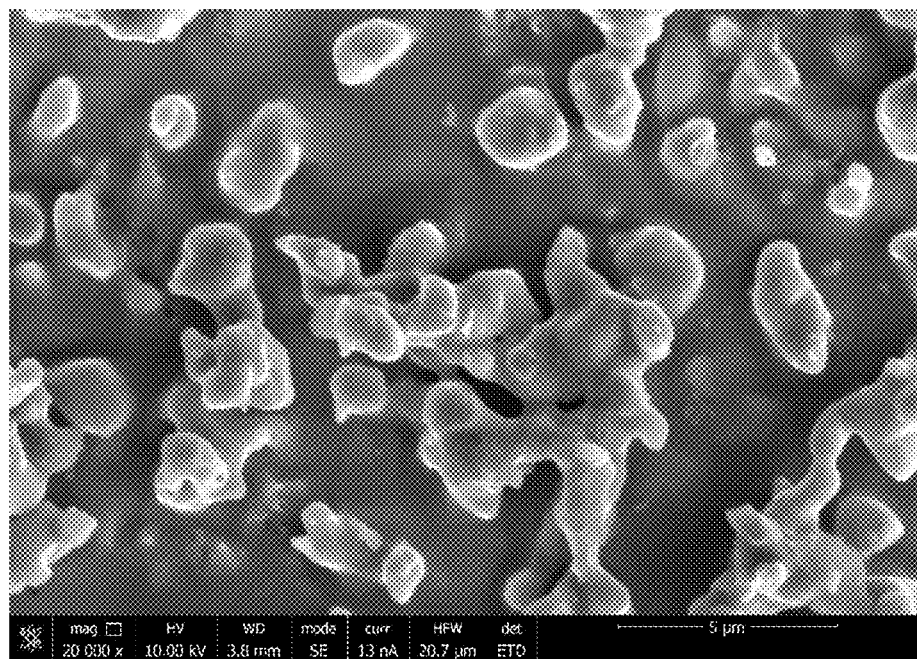
FIG. 11 is the SEM photo of titanium particles metallurgically bonded to a titanium substrate.

In an aspect, the particles comprise a metal or carbon. In an aspect, the particles comprise the metal, wherein the metal is Ti, Nb, Ta, Ni, Cr, an alloy thereof, or a combination thereof. Use of Ti particles is mentioned. In an aspect, the particles may comprise an intermetallic compound of Ti, Nb, Ta, Ni, Cr, a hydride of Ti, Nb, Ta, Ni, Cr, or a combination thereof. The intermetallic compound or the hydride may have fracture properties that facilitate formation of particles have a suitable size. Shown in FIG. 11 is an SEM photo of titanium particles metallurgically bonded to a titanium substrate. The smooth edge of the particle with the substrate is the indication of the diffusion bonding between titanium particle and the titanium substrate. It also shows the bonding between titanium particles to form a particle agglomerate.

The particles may have an average particle size of less than 200 micrometers (μm), e.g., 3 nanometers (nm) to 200 μm, 8 nm to 150 μm, 10 nm to 100 μm, 50 nm to 50 μm, or 500 nm to 10 μm. Mentioned are particles having an average particle diameter of 3 nm to 200 μm, 0.1 to 5 μm, 3 nm to 8 nm, 5 nm to 10 nm, 7 nm to 100 nm, 50 nm to 500 nm, 10 nm to 20 μm, 5 nm to 0.5 μm, 20 nm to 1 μm, 100 nm to 0.9 μm, 20 nm to 5 μm, 100 nm to 2 μm, 0.5 μm to 5 μm, 1 μm to 10 μm, 5 μm to 20 μm, 10 μm to 50 μm, 20 μm to 70 μm, 50 μm to 100 μm, 70 μm to 170 μm or 150 μm to 200 μm. Any suitable combination of the upper and lower limits of the foregoing ranges may be used. The particles may have any suitable shape, and may be spherical, ellipsoidal, or in the form of a fiber. Also, the particles may be primary particles, or agglomerates, e.g. secondary particles. Mentioned are metal particles having an average particle size of 50 nm to 10 μm, e.g., Ti particles having an average particle size of 100 nm to 5 μm. While not wanting to be bound by theory, it is understood that small particles, e.g., particles having an average particle size of 100 nm to 5 μm, can achieve the metallurgical bonding faster and at lower temperature or pressure than when larger particles are used.

In an aspect, particles comprise carbon. The carbon may be amorphous carbon, graphite, carbon fiber, or a combination thereof. While not wanting to be bound by theory, it is understood that when carbon is used, the metallurgical bond comprises a carbide formed between the carbon particle and the metallic substrate formed by the reaction between carbon particles and metal. Also, because of the high reaction activity of carbon with the metal, larger particles can be used. Mentioned is use of carbon particles having an average particle size of less than 200 μm. An average particle size of the carbon particles can be 50 nm to 500 nm, 100 nm to 1 μm, 500 nm to 2 μm, 1 μm to 5 μm, 1 μm to 10 μm, 5 μm to 20 μm, 10 μm to 50 μm, 20 μm to 70 μm, 50 μm to 100 μm, 70 μm to 170 μm, or 150 μm to 200 μm. Any suitable combination of the upper and lower limits of the foregoing ranges may be used. The carbon may be in the form of a fibrous particle. The fibrous particle may have a fiber diameter of 3 nm to 20 µm, preferably 1 to 10 µm. The diameter of the carbon fiber may be 3 nm to 8 nm, 5 nm to 10 nm, 7 nm to 100 nm, 50 nm to 500 nm, 10 nm to 20 µm, 5 nm to 0.5 µm, 20 nm to 1 µm, 100 nm to 0.9 µm, 20 nm to 5 µm, 100 nm to 2 µm, 0.5 µm to 5 µm, 1 µm to 10 µm, or 5 µm to 20 µm. Any suitable combination of the upper and lower limits of the foregoing ranges may be used.

In an aspect, the substrates and particles have a coating applied the surface before the metallurgical bonding. The coating is used to enhance the corrosion resistance and bonding activity of substrate and particles. The metallurgical bonding can be formed with the coating material.

A dimension, e.g., a length, as measured in the cross section view of the bonding interface of the metallurgical bond formed between the particles and the substrate may correspond to the particle diameter. For example, an average length of the metallurgical bond may be less than 200 µm, e.g., 3 nm to 200 µm, 8 nm to 150 µm, 10 nm to 100 µm, 50 nm to 50 µm, or 500 nm to 10 µm. Also, an area, of the metallurgical bond formed between the particles and the substrate may be less than 200 µm$^2$, e.g., 3 nm$^2$ to 200 µm$^2$, 8 nm$^2$ to 150 µm$^2$, 10 nm$^2$ to 100 µm$^2$, 50 nm$^2$ to 50 µm 2, or 500 nm$^2$ to 10 µm$^2$.

While not wanting to be bound by theory, it is understood that use of an amount of particles such that the particles cover a portion of the total projected area of the metallic substrate facilitates formation of a metallurgical bond having desired properties. While not wanting to be bound by theory, is believed about that by using a content of particles to cover less than 90% of a total area of the substrate avoids thermal stress during the formation of the metallurgical bond and the application of the component, even when there is a significant mismatch between the thermal expansion coefficients of the particles and the substrate. As used herein, the term projected area means a two-dimensional area determined in a plan view, regardless of a modularity or porosity the substrate may have. In an aspect, use of an amount of particles to cover less than 90%, or 1 to 90%, 10 to 80%, 20 to 70%, 30 to 70%, or 40 to 50% of the total projected area of the substrate is mentioned. The metallurgical bond between the particles and the substrate may have an area of less than 90%, or 1 to 90%, 10 to 80%, 20 to 70%, 30 to 70%, or 40 to 50% of the total projected area of the substrate. Any suitable combination of the upper and lower bounds of the foregoing ranges may be used.

In an aspect wherein the particles cover less than 90% of the total projected area of the substrate, neighboring particles may be separated by a distance, e.g., an average distance, of 5 nm to 200 µm, e.g., 5 nm to 10 nm, 7 nm to 100 nm, 50 nm to 500 nm, 10 nm to 20 µm, 5 nm to 0.5 µm, 20 nm to 1 µm, 100 nm to 0.9 µm, 20 nm to 5 µm, 100 nm to 2 µm, 0.5 µm to 5 µm, 1 µm to 10 µm, 5 µm to 20 µm, 10 µm to 50 µm, 20 µm to 70 µm, 50 µm to 100 µm, 70 µm to 170 µm, or 150 µm to 200 µm. Any suitable combination of the upper and lower limits of the foregoing ranges may be used.

The particles may further comprise ceramic particles, wherein the ceramic particles comprise a carbide, an oxide, a nitride, a silicide, or a combination thereof. While not wanting to be bound by theory, it is understood that by including the ceramic particles, the ceramic particles may bond to the above-mentioned metal particles, resulting in reduced thermal stress. Representative carbides include titanium carbide, niobium carbide, silicon carbide, tantalum carbide, tungsten carbide, iron carbide, chromium carbide, or zirconium carbide. Representative oxides include aluminum oxide, titanium oxide, niobium oxide, tantalum oxide, zirconium oxide, cerium oxide, silicon dioxide, tungsten oxide, or cerium oxide. Representative nitrides include titanium nitride, chromium nitride, aluminum nitride, niobium nitride, tantalum nitride, zirconium nitride, tungsten nitride, vanadium nitride, tantalum nitride, or niobium nitride. Representatives silicides include nickel silicide, niobium silicide, titanium silicide, molybdenum silicide, or tungsten silicide. A combination comprising at least one of the foregoing may be used. Use of aluminum oxide is mentioned.

Figure 2:
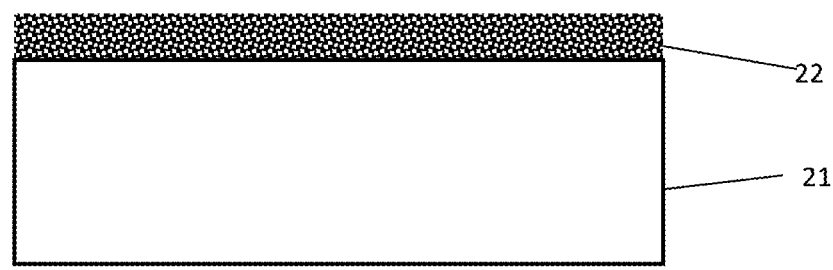
FIG. 2 is a schematic cross-sectional view of a porous coating layer on the substrate.
Figure 12:
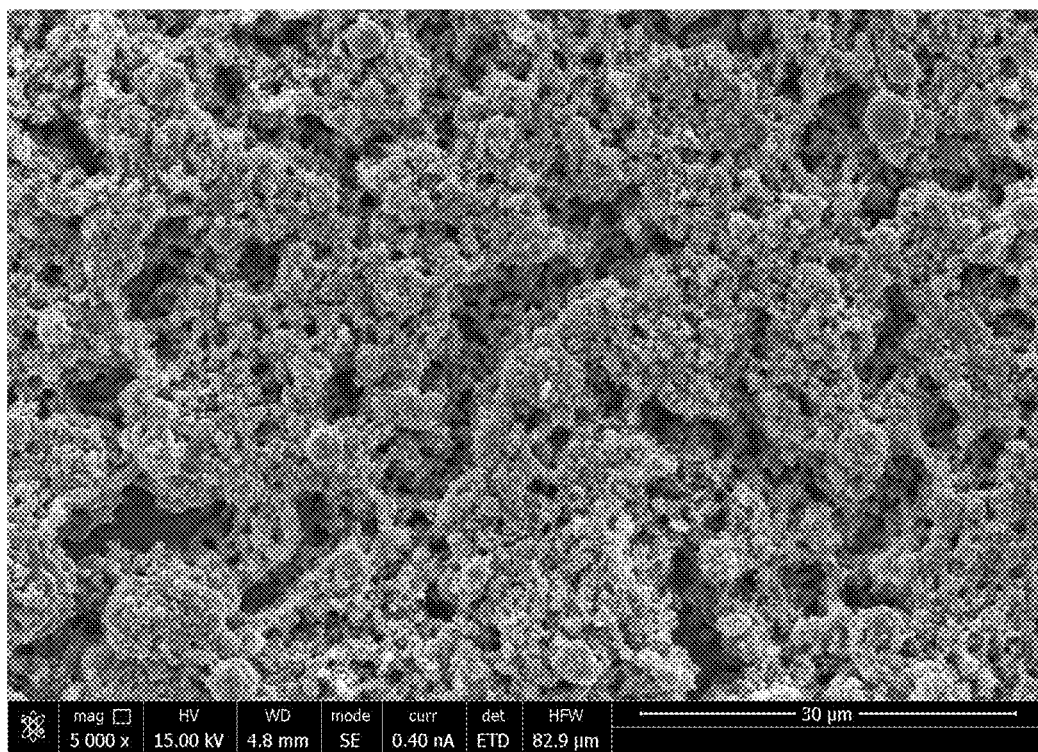
FIG. 12 is the SEM photo of a porous titanium coating on a titanium substrate.

In an aspect, the particles bonded to the metallic substrate form a porous coating as shown in FIG. 2, which shows the metallic substrate 21 and the porous coating 22 comprising the metallurgically bonded particles. The porous coating may have an average pore diameter of 3 nm to 100 µm, e.g., 3 nm to 100 µm, 10 nm to 50 µm, or 50 nm to 500 nm. Use of a pore diameter of 3 nm-7 nm, 5 nm to 10 nm, 7 nm to 20 nm, 50 nm to 500 nm, 10 nm to 20 µm, 5 nm to 0.5 µm, 20 nm to 1 µm, 100 nm to 0.9 µm, 20 nm to 5 µm, 100 nm to 2 µm, 0.5 µm to 5 µm, 1 µm to 10 µm, 5 µm to 20 µm, 10 µm to 50 µm, 20 µm to 100 µm, or 50 µm to 100 µm is mentioned. In an aspect, the thickness of the porous coating 22 is in the range of 1 µm to 1 millimeter (mm), e.g., 1 µm to 10 µm, 5 µm to 20 µm, 10 µm to 100 µm, 50 µm to 200 µm, 100 µm to 500 µm, 200 µm to 800 µm, 500 µm to 1000 µm, or 700 µm to 1 mm. Any suitable combination of the upper and lower bounds of the foregoing ranges may be used. While not wanting to be bound theory, it is understood that the metallurgical bonding of the particle with the substrate provides for reduced shrinkage, e.g., by restraining the shrinkage of the particles to a vertical direction, e.g., orthogonal to the substrate surface, and reducing or eliminating shrinkage in an in-plane direction of the substrate, e.g., along the surface of substrate. By eliminating shrinkage in an in-plane direction, the porous coating 22 can be formed to conform to a shape and structure of the substrate without distortion. Also, multiple particle deposition and bonding processes can be applied to provide multiple layers to provide a porous layer having increased thickness. An example is shown in FIG. 12, which is the SEM photo of porous titanium coating on the surface of a titanium substrate.

Figure 3:
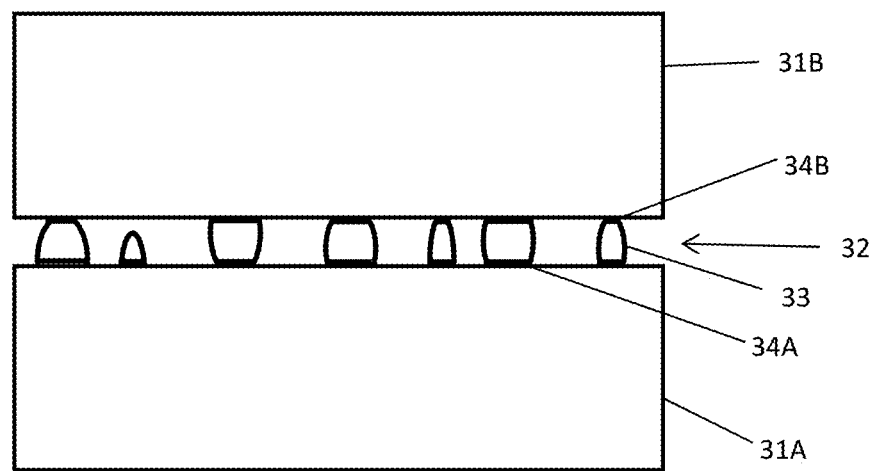
FIG. 3 is a schematic cross-sectional view of two substrates and a metallurgical bonding layer between the substrates.

In an aspect, a second substrate may be provided and metallurgically bonded to the particles. The second substrate may be a mass transport layer for a fuel cell or electrolyzer, for example. As shown in FIG. 3, which illustrates a component having a metallic substrate 31A, a second substrate 31B, and a non-continuous bonding layer 32 between the metallic substrate 31A and the second substrate 31B. The non-continuous bonding layer 32 comprises the particles 33, which are bonded to the metallic substrate 31A by a first metallurgical bond 34A and a second metallurgical bond 34B with the second substrate 31B. The thickness of the non-continuous bonding layer 32 is in the range of 1 µm to 0.5 mm, e.g., 1 µm to 500 µm, 5 µm to 200 µm, or 10 µm to 100 µm. Any suitable combination of the upper and lower bounds of the foregoing ranges may be used. As shown in FIG. 3, the particles are disposed between the metallic substrate and the second substrate, and the substrates are bonded together by the particles and the metallurgical bonds to provide a continuous bond to the particles in a direction orthogonal to the substrates and discontinuous in an in-plane direction.

The second substrate may be the same as or different than the metallic substrate. The second substrate may comprise carbon or Ti, Nb, Ta, Al, Ni, Cr an alloy thereof, stainless steel, or a combination thereof. The second substrate may have a suitable form and may fully dense or porous, and may be in the form of a film, a foil, a screen, a mesh, a perforated film, an expanded metal foil, or a microporous plate. In an aspect, the second substrate comprises carbon, and may be a porous, nonwoven carbon paper. In an aspect, the second substrate may comprise a metal, and may be an expanded metal substrate, such as a screen or mesh.

Figure 4:
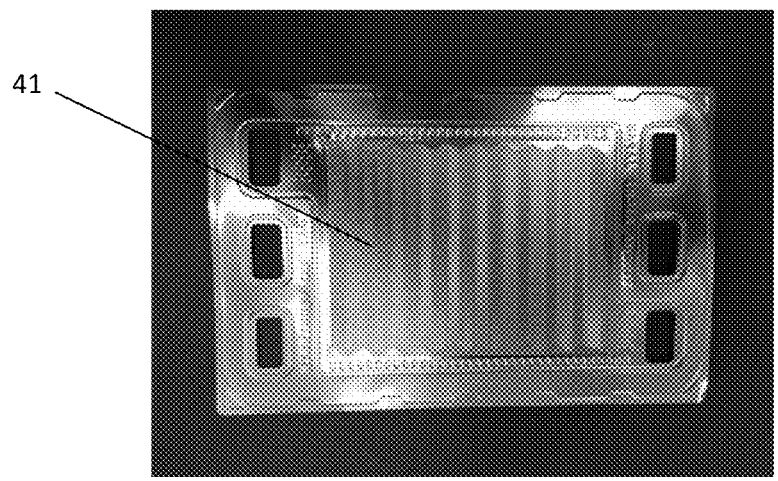
FIG. 4 is a photo of the stamped stainless steel bipolar plate for a fuel cell.
Figure 5:
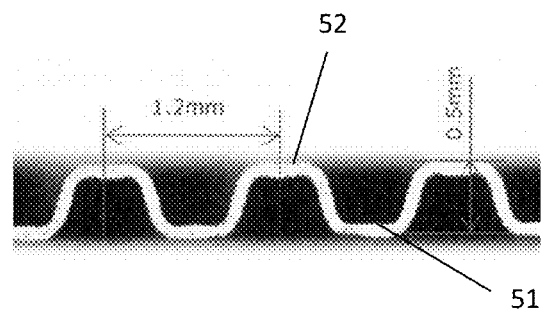
FIG. 5 is a cross section of a stainless steel bipolar plate.

An example of a metallic substrate for a fuel cell is shown in FIGS. 4 and 5, which shows a fuel cell bipolar plate. To form the bipolar plate, a stainless steel foil is stamped with the flow field channels 41, to provide a land area 52 and a valley area 51. The land area 51 will be in electrical contact with a second substrate, e.g., a gas diffusion layer (GDL). It may be desired to form the deeper channels to improve water management. However, it is difficult to obtain the deep channel by stamping alone because of the limitations of the metal foil properties (such as elongation). The channel depth may be increased by adding a thick porous coating of particles on the top of the land area 52. The particles could be metal only or the mixture of metal with carbon particles. The particles are deposited on the land area, and the plate with the particles on the land area 51 heat-treated to bond the particles to the substrate to provide a substrate with flow channels and a thick porous coating on the land area. The thickness of the porous coating is between 0.01 mm to 0.5 mm, e.g., 0.01 to 0.05 mm, 0.02 to 0.1 mm, 0.05 to 0.2 mm, 0.1 to 0.3 mm, or 0.2 to 0.5 mm. Use of a titanium particle for the thick porous coating on the land area 52 is mentioned. Use of a mixture of titanium and carbon powers is also mentioned to provide reduced surface contact resistance.

If desired, an additional coating may be provided to modify the surface properties. For example, without an additional coating, the component may have a super-hydrophilic water contact angle, e.g., a water contact angle of less than 90°, e.g., 5° to 40°, 10° to 20°, or less than 15°. In an aspect, a hydrophobic material, such as poly(tetrafluoroethylene), can be applied to the porous surface layer to provide a super-hydrophobic surface having a contact angle >150', e.g., 170°.

In an aspect, porous metal layer is used as mass transport layer for electrolyzers. The pore size is 20 to 500 µm. Use of a porous titanium particle sinter or titanium felt is mentioned. Naturally, large pores are preferred for gas transport and small pores are preferred for water transport through the mass transport layer. But in conventional manufacturing process, it is difficult to have both small (less than 1 µm) and large size pores. In the disclosed component a micro porous metal coating layer is formed on the core structure of the macro porous metal mass transport layer to form a hybrid porous layer, containing both micro- and macro-sized pores. The micro porous coating layer has pore size in the range of 3 nm to 1 µm. It can wick water in the micron sized pores to maintain a continuous water supply to an electrode and maintain gas flow through large pores. The capillary force of water in micron sized pores prevents gas intrusion into the micro porous coating layer to provide a non-interrupted water supply. In the hybrid porous structure, gas and water transport through their different pathways. The particle size may be 3 nm to 2 µm, preferably 10 nm to 1 µm, e.g., 3 nm to 8 nm, 5 nm to 10 nm, 7 nm- to 100 nm, 50 nm to 500 nm, 10 nm to 1 µm, 200 nm to 2 µm, or 0.5 µm to 2 µm.

As is further discussed below, the component may be evaluated by determining surface contact resistance using carbon paper, e.g., AvCarb MGL 190, with 200 psi compression pressure after treatment in a pH 3 solution of $H_2SO_4$ with 0.1 ppm HF at 80° C. and at 0.8 $V_{NHE}$, as defined by the Department of Energy (DOE) Hydrogen and Fuel Cell Technologies Office's Multi-Year Research, Development, and Demonstration Plan (https://www.energy.gov/eere/fuelcells/downloads/hydrogen-and-fuel-cell-technologies-office-multi-year-research-development), the content of which is incorporated herein by reference in its entirety. The disclosed component may have a surface contact resistance of 0.1 to 10 mΩ·cm², 5 to 8 mQ·cm², or 1 to 5 mQ·cm² to meet the fuel cell application requirement, when evaluated according to the DOE method.

Also disclosed is a method of manufacturing a component for an electrochemical device, the method comprising: providing a metallic substrate; disposing a composition comprising a plurality of precursor particles on the metallic substrate, wherein the precursor particles comprise a metal, carbon, metal hydride or a combination thereof, to provide a coated substrate, wherein the precursor particles contact less than 90% of a total projected area of the substrate, and wherein the precursor particles have an average particle size of less than 200 µm; and heat-treating the coated substrate to form particles from the precursor particles, and bond the particles to the substrate by a metallurgical bond formed between the particles and the metallic substrate to manufacture the component, wherein the metallurgical bond has a composition which is a combination of a composition of the metallic substrate and a composition of the particle, a reaction product of the substrate and the particle, or a combination thereof.

The precursor particles comprise a metal, carbon, a metal hydride, or a combination thereof of Ti, Nb, Ta, Ni, Cr, an alloy thereof, or a combination thereof. Use of an alloy or an intermetallic compound of Ti, Nb, Ta, Ni, or Cr is mentioned. In an aspect the precursor particles comprise titanium hydride. Mentioned is use of a combination of titanium particles and carbon particles to provide a metallurgical bond comprising titanium carbide. The precursor particles may have a particle size of less than 200 micrometers (µm), e.g., 3 nanometers (nm) to 200 µm, 8 nm to 150 µm, 10 nm to 100 µm, 50 nm to 50 µm, or 500 nm to 10 µm. The content of precursor particles on the substrate may be provided to cover 1% to 90%, 6% to 80%, 10% to 70%, 20% to 60%, or 40% to 50% of a total projected area of the substrate. Any suitable combination of the upper and lower limits of the foregoing ranges may be used.

Any suitable combination of the upper and lower limits of the foregoing ranges may be used. In an aspect, a combination of precursor particles is used. While not wanting to be bound by theory, it is understood that use of particles having different melting temperatures can provide the metallurgical bond at a lower temperature with reduced shrinkage, e.g., lower melting particles may bond higher melting particles and the substrate.

The composition may further comprise a plurality of ceramic particles, wherein the ceramic particles comprise a carbide, an oxide, a nitride, or a combination thereof, as is further described above. While not wanting to be bound by theory, it is understood that when the ceramic particles are used, shrinkage may be reduced.

The composition comprising the precursor particles may be disposed by any suitable method. Dry powder deposition, or coating or tape casting using a carrier or vehicle, such as an organic solvent, is disclosed. Dry powder deposition may comprise electrostatic deposition of a dry powder comprising the precursor particles. In the electrostatic deposition process, the particle may be charged, and the charged particles disposed on the metallic substrate under an applied electrical field. While not wanting to be bound by theory, it is understood that electrostatic deposition may be desirable to reduce particle agglomeration and provide a more uniform layer of the particles on the substrate. Alternatively, the precursor particles may be dispersed in a solvent comprising a binder to provide a slurry, and in the slurry coated onto the substrate. The binder may include those used in ceramic process, such as polyvinyl butyral or polyethylene carbonate. Additional details of the coating process may be determined by one of skill in the art without undue experimentation.

In an aspect, the heat-treating may comprise heat-treating at a temperature that is less than a melting temperature of the particles, and less than a melting temperature of the metallic substrate or the second substrate. While not wanting to be bound by theory, it is understood that the heat-treating results in a metallurgical bond obtained by cross diffusion or a chemical reaction where the particles contact the substrate to form the metallurgical bond at an interface of the particle and the substrate. The heat-treating may comprise heat-treating at 300° C. to 1200° C., e.g., 400° C. to 1000° C., or at or below 800° C. Use of a bonding temperature of 800° C. or less may be preferred to avoid the distortion of the metallic substrate. In an aspect, use of a temperature that is at least 500° C. less than the melting temperature of the substrate, to avoid the substrate distortion, is mentioned. Avoiding distortion may be advantageous when the component, e.g., a bipolar plate, comprises structural features such as flow channels. Also, while not wanting to be bound by theory, is believed that the disclosed particle size permits formation of the metallurgical bond in a reduced time, e.g., 0.001 hours to 20 hours, 0.01 hour to 10 hours, or 0.1 hour to 5 hours. The heat-treating may comprise heat-treating in a furnace, or may comprise laser, e-beam, infra-red (IR), or plasma heat-treating. In laser heating, a high intensity laser beam is used to scan the precursor particle loaded substrate and heat the substrate surface to form the metallurgical bond and bond the particles to the substrate. In another embodiment, a high intensity IR lamp is used. Use of e-beam heating to heat to provide rapid heating is mentioned.

The heat-treatment may comprise heat-treating in a vacuum, or in a non-oxidizing atmosphere, e.g., in argon, helium, or a combination thereof.

The method may further comprise pressing the coated substrate with a pressure of 1 to 500 pounds per square inch (PSI), 20 to 400 PSI, or 50 to 100 PSI. If a second substrate is used, the pressing may comprise applying the pressure to the metallic substrate and the second substrate to compress the particles.

In an aspect, a textured carbon coating is achieved with a single step that melts carbon particles and deposits melted particles at the same time. A high temperature is used to melt carbon particles because of the high melting temperature of carbon (3550° C.). The heat source for the high temperature could be a plasma, high power pulsed laser or electrical arc. At the high temperature, the carbon particles will be partially vaporized, and thus the finished coating can have a textured structure comprising a carbon standout that covers a small portion of substrate surface, and the rest of the surface is covered by a thin film of the carbon coating.

As used herein, "metallurgical bonding" is a type of chemical bonding between two solid materials, including at least one metallic material, formed at high temperature. It has two types of bonding. One is diffusion bonding in which two materials cross-diffuse at high temperature to form a continuous connection. The other is reaction bonding in which two materials react where they contact. The reaction products connect the two materials together. Both types of metallurgical bonding achieve atomic level mixing of the two materials and could extend two materials from point contact to surface/interface contact. The atomic level mixing and the large contact area ensure the durable bonding between two materials.

In an aspect, the metallurgical bond has a composition which is a combination of a composition of the metallic substrate and a composition of the particle, a reaction product of the substrate and the particle, or a combination thereof. The composition of the metallurgical bond may be a combination of the substrate composition and the particle composition. In an aspect, the metallurgical bond comprises a reaction product of the particles, a reaction product of the particle and the substrate, or a combination thereof.

A thickness of the metallurgical bond may be 0.5 nm to 50 µm, e.g., 0.5 nm to 5 nm, 1 nm to 10 nm, 5 nm to 50 nm, 10 nm to 50 nm, 10 nm to 100 µm, 50 nm to 0.2 µm, 100 nm to 1 µm, 500 nm to 5 µm, 20 nm to 5 µm, 1 µm to 10 µm, 5 µm to 20 µm, 10 µm to 50 µm, or 20 µm to 50 µm. Any suitable combination of the upper and lower bounds of the foregoing ranges may be used.

In the method, the heat-treated component may be washed, e.g., to remove unbound particles. The washing may comprise contacting heat-treated component with a fluid, e.g., air or water, and may comprise ultrasonic water bath cleaning, or acid washing, for example.

As used herein, "average particle size" refers to a particle diameter corresponding to 50% of the particles in a distribution curve in which particles are accumulated in the order of particle diameter from the smallest particle to the largest particle and a total number of accumulated particles is 100%. The average particle size may be measured by methods known to those of skill in the art. For example, the average particle size may be measured with a particle size analyzer, e.g., y dynamic light scattering, or may be measured using a transmission electron microscope (TEM) or a scanning electron microscope (SEM).

Disclosed herein is a component for an electrochemical device, the component comprising: a metallic substrate; and a plurality of particles bonded to a surface of the substrate by a metallurgical bond, wherein the particles comprise a metal, carbon, or a combination thereof, wherein the metallurgical bond is between the particles and the substrate and between particles and particles, wherein a total projected area of the metallurgical bond is less than 90% of a total projected area of the substrate, and wherein the metallurgical bond has a composition which is a combination of a composition of the metallic substrate and a composition of the particle, a reaction product of the metallic substrate and the particle, or a combination thereof.

Also disclosed is a method of manufacturing a component for an electrochemical device, the method comprising: providing a metallic substrate; disposing a composition comprising a plurality of precursor particles on the metallic substrate, wherein the precursor particles comprise a metal, carbon, metal hydride or a combination thereof, to provide a coated substrate, wherein the precursor particles contact less than 90% of a total projected area of the substrate, and wherein the precursor particles have an average particle size of less than 200 µm; and heat-treating the coated substrate to form particles from the precursor particles, and bond the particles to the substrate by a metallurgical bond formed between the particles and the metallic substrate to manufacture the component, wherein the metallurgical bond has a composition which is a combination of a composition of the metallic substrate and a composition of the particle, a reaction product of the substrate and the particle, or a combination thereof.

In any of the foregoing embodiments, the metallic substrate may comprise Ti, Nb, Ta, Ni, Cr an alloy thereof, stainless steel, or a combination thereof the particles may comprise the metal, and the metal may be Ti, Nb, Ta, Ni, Cr an alloy thereof, or a combination thereof the plurality of particles may have an average particle size of less than 20 µm; the plurality of particles may be metal particles having an average particle size of 50 nm to 10 µm; the plurality of particles may be Ti particles having an average particle size of 100 nm to 5 µm; the particles may comprise carbon, and the carbon may be amorphous carbon, graphite, carbon fiber, or a combination thereof, and wherein the carbon has an average particle size of less than 200 µm; the total projected area of the metallurgical bonding may be 1% to 70% of the total projected area of the substrate; optionally further comprising a plurality of ceramic particles on the substrate, wherein the ceramic particles comprise a carbide, an oxide, a nitride, a silicide, or a combination thereof optionally wherein the component may be a bipolar plate for a fuel cell or an electrolyzer; the bipolar plate may have a surface electrical contact resistance of less than 10 mΩ·cm² at a compression pressure of 200 PSI after treatment in a pH 3 solution of $H_2SO_4$ and 0.1 ppm HF at 80° C. and at 0.8 $V_{NHE}$ for 100 hours; optionally the component may be an electrode for an electrolyzer or a flow battery; optionally further comprising a second substrate on a side of the plurality of particles opposite the metallic substrate, wherein the second substrate comprises carbon or Ti, Nb, Ta, Ni, Cr an alloy thereof, stainless steel, or a combination thereof, wherein the particles are bonded to the second substrate by a second metallurgical bond that is between the particles and the second substrate, wherein a projected area of the second metallurgical bond is less than 90% of a total projected area the second substrate, and wherein the second metallurgical bond has a composition which is a combination of a composition of the second substrate and a composition of the particle, a reaction product of the second substrate and the particle, or a combination thereof; the metallic substrate and the second substrate may have a same composition; the second substrate may comprise multiple layers having structure or composition gradient; the second substrate may be a metal screen having an open area of 10% to 90%, based on a total projected area of the second substrate; the second substrate may be a porous mass transport layer having a porosity of 30% to 95%; optionally the electrochemical device may be a fuel cell, a battery, electrolyzer, or a capacitor; metallic substrate may comprise Ti, Nb, Ta, Al, Ni, Cr an alloy thereof, stainless steel, or a combination thereof; the precursor particles may comprise Ti, Nb, Ta, Al, Cr an alloy thereof, an intermetallic compound thereof, a hydride thereof, or a combination thereof, and has an average particle size of 50 nm to 20 µm; the precursor particles may comprise carbon particles having an average particle size of less than 200 µm; the precursor particles may cover 3% to 90% of the total projected area of the substrate; the heat-treating may comprise heat-treating in a vacuum or in a non-oxidizing atmosphere, and wherein the heat-treating comprises electron-beam surface heating or laser surface heating; the composition may further comprise a plurality of ceramic particles, wherein the ceramic particles comprise a carbide an oxide, a nitride, or a combination thereof; optionally further comprising disposing a second substrate on a side of the plurality of particles opposite the metallic substrate, wherein the second substrate comprises carbon or Ti, Nb, Ta, Ni, Cr an alloy thereof, stainless steel, or a combination thereof, and wherein the particles are bonded to the second substrate by a second metallurgical bond that is between the particles and the second substrate, wherein the total projected area of the second metallurgical bond is less than 90% of the total projected area of the substrate, and wherein the second metallurgical bond has a composition which is a combination of a composition of the second substrate and a composition of the particle, a reaction product of the second substrate and the particle, or a combination thereof.

EXAMPLES

Comparative Example 1: Sputtered Carbon on Titanium

Commercially obtained Grade 2 titanium foil was used as the substrate. The titanium foil was coated with 50 nm Ti and 100 nm carbon on the entire surface by sputtering deposition (SP-C coating).

Example 1. Milled Carbon Fiber on Titanium Foil

Commercially obtained Grade 2 titanium foil was used as the substrate. Milled carbon fiber particles were loosely sprinkled on the surface, then heat treated at 900° C. for 1 hour in argon. The milled carbon fiber particles were 8 µm in diameter and 50-200 µm long. The milled carbon fiber particles partially covered titanium surface and could not be removed by ultrasonic cleaning, indicating a strong bond of the carbon fiber with titanium.

Contact Resistance

The electrical contact resistance of coated titanium foil of Comparative Example 1 and Example 1 was measured before and after a standard corrosion test with AvCarb MGL 190 carbon paper. The accelerated corrosion test was conducted in pH 3 solution of $H_2SO_4$ with 0.1 ppm HF at 80° C. and at 1.4 $V_{NHE}$. The electrical contact resistance before and after the corrosion test was determined using AvCarb MGL 190 carbon paper with 200 psi compression pressure.

The surface contact resistance Comparative Example 1 increased from an initially 4.0 mΩ·cm² to 28 mΩ·cm² and 333 mΩ·cm² after the 1.4 $V_{NHE}$ corrosion test for 0.5 hour and 2 hours, respectively. After the corrosion tests, the surface composition of Comparative Example 1 was analyzed using X-ray photoelectron spectroscopy (XPS). The XPS analysis found that the titanium surface was still covered by carbon, indicating the carbon coating was not completely consumed in the corrosion test. While not wanting to be bound by theory, it is believed that the high contact resistance results from the interface between carbon and titanium substrate, more specifically due to the oxidization of the titanium resulting in titanium oxide under the carbon coating layer.

In comparison, the contact resistance of Example 1 increased from initially 0.7 mΩ·cm² to 1.4 mΩ·cm² and 1.7 mΩ·cm² after the 1.4$V_{NHE}$ corrosion test for 1.5 hours and 6 hours, respectively. Optical microscope observation found that the majority of carbon fiber was still bonded on titanium surface. The durability of the carbon fiber coating on the titanium is understood to result from a metallurgical bond comprising titanium carbide.

Example 2: Graphite on Titanium

To demonstrate applicability for a bipolar plate for a fuel cell or electrolyzer, a commercial pure titanium foil was selected as the substrate for the surface modification to achieve the low electrical surface contact resistance. The thickness of the titanium foil is 0.1 mm. The graphite powders with the average particle size of 7-11 µm (Alfa Aesar #46304) is used as the particle material.

The graphite particles are dispersed in ethanol solution to make the slurry with 20 weight percent (wt) % of graphite, based on a total weight of the slurry. The slurry is coated on the titanium surface and dried, leaving graphite particles on the surface. Then, the titanium foil with graphite particles heat-treated in a vacuum chamber with a focused electron beam for surface heating. The graphite particles reacted with the titanium to form a metallurgical bond comprising titanium carbide between the graphite particles and the titanium foil.

Figure 8:
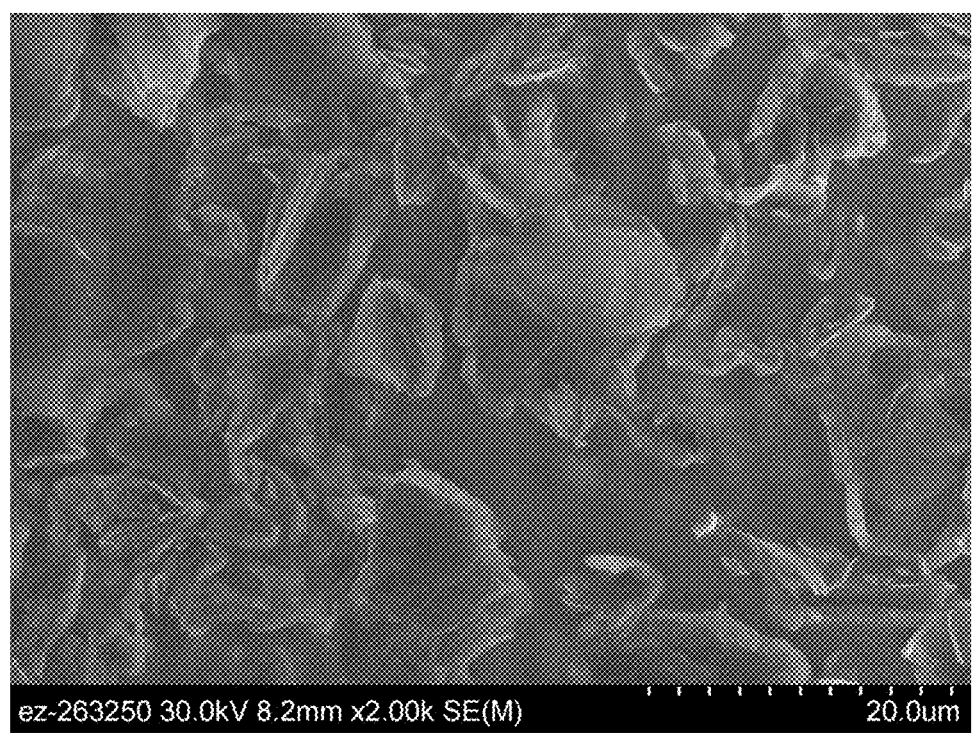
FIG. 8 is a SEM photo of graphite particles metallurgically bonded to a titanium substrate.

After the bonding step, the plate is cleaned in ultrasonic bath to remove the loose graphite particles. The metallurgically bonded graphite particles remained on the titanium substrate surface. FIG. 8 shows the SEM photo of the graphite particles bonded on the titanium foil surface.

Example 3: Glassy Carbon on Titanium

A commercial pure titanium foil is used as the substrate. A 0.1 mm thick titanium foils is used the substrate. The glassy carbon spherical powder with the particle size of 10-20 µm (Alfa Aesar #43489) is used as the particle material. The glassy carbon powder is dispersed in ethanol solution by ultrasonic dispersion. Then polyvinyl butyral is added to the slurry as the binder. The carbon particle concentration is 15 wt % and binder concentration is 2 wt % in the slurry, based on a total weight of the slurry.

Figure 6:
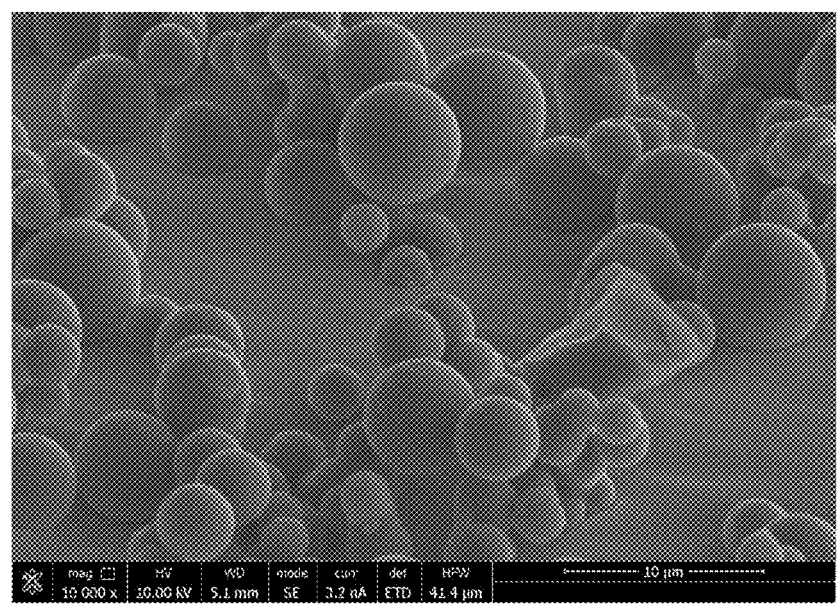
FIG. 6 is a SEM photo of glassy carbon spherical particles metallurgically boned on a titanium substrate.
Figure 7:
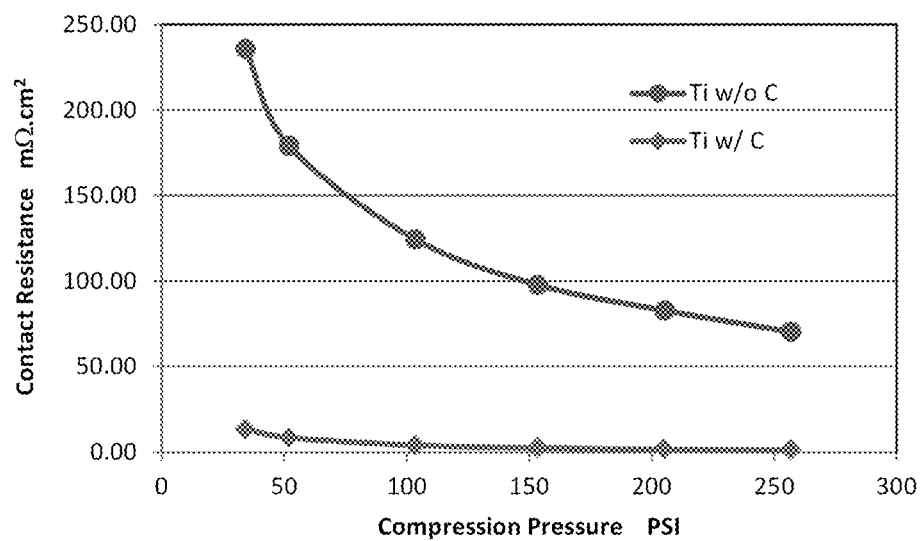
FIG. 7 is a graph of contact resistance (milliohms-square centimeters, mΩ·cm$^2$) versus compression pressure (pounds per square inch, PSI) showing a comparison of the surface contact resistance of carbon felt on a titanium plate with or without carbon particles metallurgically bonded to the surface.

The titanium plate was dipped into the carbon particle slurry to coat a thin layer of the slurry on the titanium surface. Then, the coated plate was heat-treated in vacuum at 800° C. for 1 hour to metallurgically bond carbon particles to the titanium. After the heat-treating, the plate is cleaned in an ultrasonic bath to remove the un-bonded carbon particles. The bonded particles remained on the plate surface. FIG. 6 shows an SEM picture of the glassy spherical carbon particles metallurgically bonded to titanium surface. FIG. 7 shows the electrical contact resistance of the carbon particle bonded plate (Ti w/C) with carbon paper (AvCarb MGL 190) at different compression pressures, in comparison with that of a titanium plate without carbon particles bonded on the surface (Ti w/o C). FIG. 7 shows that the carbon particles reduced the electrical contact resistance of the titanium plate with carbon felt from 82 mΩ·cm$^2$ to 1.6 mΩ·cm$^2$ at 200 psi compression pressure.

Example 4: Titanium-Carbon Composite on Stainless Steel

To demonstrate applicability for a bipolar plate for fuel cell, or an electrode for zinc-bromine flow battery, a stainless steel mesh is used as the substrate. The center of the mesh is stamped to form a channeled structure. Titanium powder is mixed with the milled carbon fiber particles in ethanol with polyvinyl butyral as the binder. The average particle size of the titanium powder is 2.2 µm and the milled carbon fiber has an average fiber diameter of 8 µm and a length of 50-200 µm. The volume ratio of titanium to carbon is 1:1 and the concentration of particles in the slurry is 25 wt %, and the concentration of the binder is 5 wt %, both based on a total weight of the slurry.

The stainless steel mesh was dipped into the slurry to coat the mesh with a layer of the slurry. After the slurry was dried on the stainless steel mesh, the mesh was heat-treated in vacuum at 800° C. for 1 hr. The titanium particles and carbon fibers particles are metallurgically bonded with stainless steel mesh, and bonded with each other, to form a porous metal-carbon composite plate. In the resulting component, the net structure of the stamped stainless steel mesh and the flow channels was retained.

Figure 9:
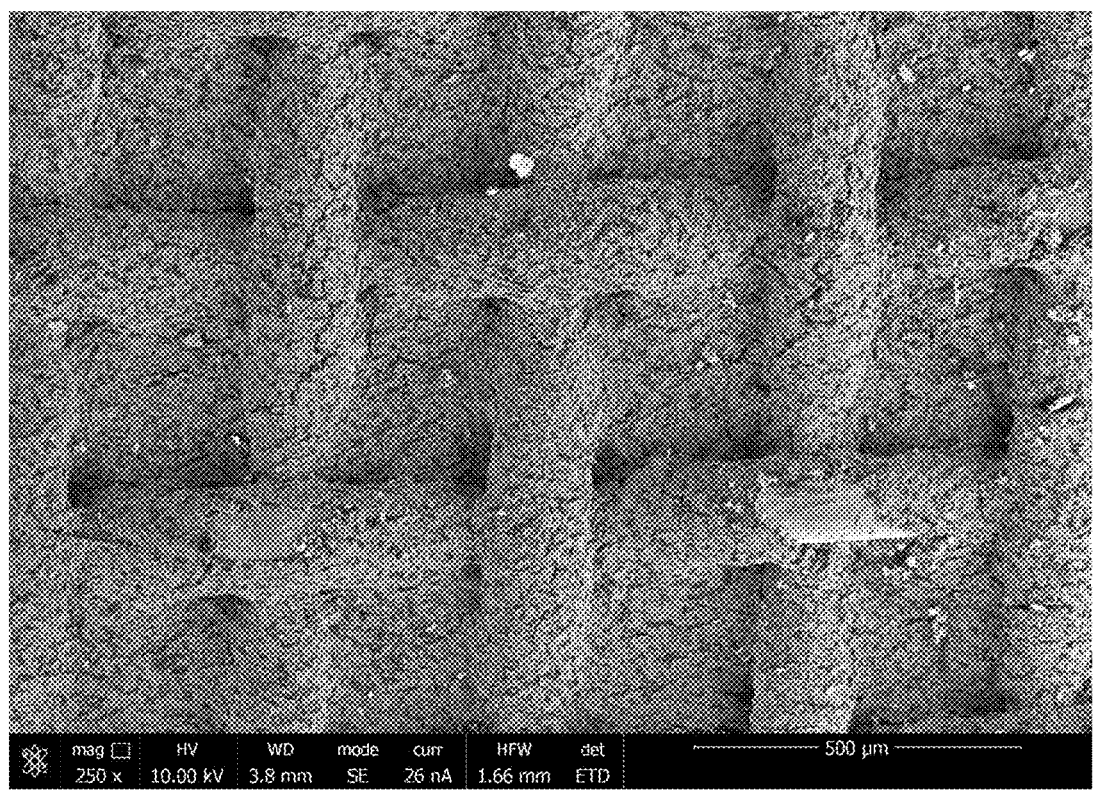
FIG. 9 is a SEM photo of a composite of titanium particles and milled carbon fiber particles metallurgically bonded to a stainless steel mesh.
Figure 10:
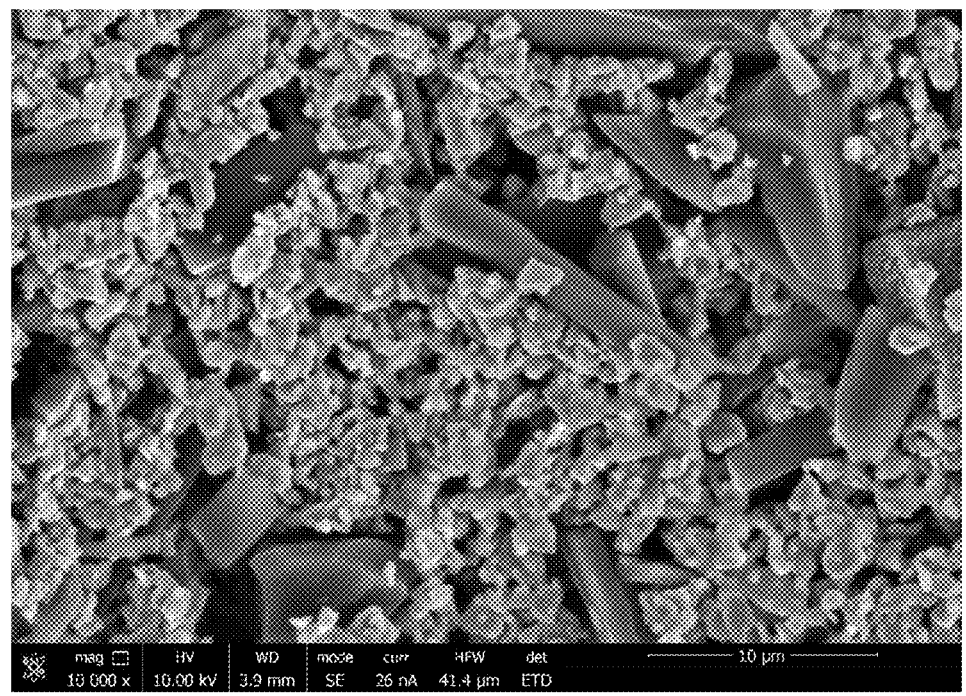
FIG. 10 is a SEM photo illustrating the microstructure of a composite of titanium particles and milled carbon fiber particles.

While not wanting to be bound by theory, it is understood that the stainless mesh can hold the titanium and carbon particles during the heat-treating, constraining the shrinkage of particles to a direction orthogonal to a surface of the substrate, minimizing shrinkage in an in-plane direction. FIG. 9 shows an SEM photo of coated stainless steel mesh. FIG. 10 shows an enlarged view, illustrating the microscopic structure of the Ti particles and milled carbon fiber particles coating on stainless steel mesh.

Example 5: Titanium on Stainless Steel

A 316L stainless steel foil is used as the substrate. The thickness of stainless steel foil is 0.1 mm. Titanium powder with a particle size of 2.2 µm is used as the particle material.

10 grams titanium powder is dispersed in 30 grams ethanol by ultrasonic dispersion. Then 20 grams 15 wt % of polyvinyl butyral ethanol solution is added to the titanium powder slurry. The mixture is put on roller mixer for 12 hours to completely mix the titanium power with polyvinyl butyral to make a slurry. The slurry is painted on the stainless steel foil using an air spray gun, and dried at 80° C. for 1 hour. The dried titanium particle coating on stainless steel is about 25 µm thick. The coated stainless steel is heat-treated in vacuum at 750° C. for 1 hour to metallurgically bond the titanium particle on stainless steel foil surface. Then the stainless steel plate is ultrasonically cleaned to remove any loose titanium powder. The titanium powder formed a rough, porous structure on the stainless steel surface.

Example 6: Graphite on Porous Titanium

A porous titanium felt is used as the substrate. The thickness of the titanium felt is 250 µm, and porosity is 75%. Graphite powder (Alfa Aesar 46304) is used as the particle material. The graphite powder is dispersed in an ethanol solution with polyvinyl butyral to make a stable slurry. The slurry contained 5 wt % graphite and 1 wt % polyvinyl butyral, based on a total weight of the slurry. Then the titanium felt is soaked in the slurry to load the titanium felt with the graphite particles. After the slurry is dried, the graphite loaded titanium felt is heat-treated at 750° C. for 1 hour to metallurgically bond graphite particles on titanium felt. The graphite particles will function as electrode reaction sites when it is used as flow battery electrode. The metallurgical bonding of the graphite particles on the titanium felt eliminates the need for a platinum coating.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer" or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

What is claimed is:

1. A component for an electrochemical device, the component comprising:
    a substrate comprising a porous carbon material; and
    a mixture of
        a plurality of particles comprising carbon, and
        a plurality of particles comprising metal bonded to a surface of the substrate,
    wherein the particles comprising carbon are bonded to the surface of the substrate by the particles comprising metal through a metallurgical bond comprising a carbide.

2. The component of claim 1, wherein the particles comprising carbon comprise amorphous carbon.

3. The component of claim 1, wherein the particles comprising carbon comprise graphite.

4. The component of claim 1, wherein the particles comprising carbon comprise carbon fiber.

5. The component of claim 1, wherein the metal particles comprise titanium.

6. The component of claim 1, wherein the metal particles comprise niobium.

7. The component of claim 1, wherein the metal particles comprise chromium.

8. The component of claim 1, wherein the metal particles comprise tantalum.

9. The component of claim 1, wherein the porous carbon material comprises carbon paper.

10. The component of claim 1, wherein the porous carbon material comprises carbon felt.

11. An electrochemical device comprising the component of claim 1, wherein the electrochemical device is a fuel cell.

12. An electrochemical device comprising the component of claim 1, wherein the electrochemical device is a battery.

13. An electrochemical device comprising the component of claim 1, wherein the electrochemical device is an electrolyzer.

14. An electrochemical device comprising the component of claim 1, wherein the electrochemical device is a capacitor.

15. The component of claim 1, wherein the plurality of particles comprising carbon have an average particle size of 100 nanometers to 200 micrometers.

16. The component of claim 1, wherein the plurality of particles comprising metal bonded to the surface of the substrate have an average particle size of 50 nanometers to 10 micrometers.

17. The component of claim 1, wherein:
    the plurality of particles comprising carbon have an average particle size of 100 nanometers to 200 micrometers; and
    the plurality of particles comprising metal bonded to the surface of the substrate have an average particle size of 50 nanometers to 10 micrometers.

18. The component of claim 1, wherein the plurality of particles comprising carbon have an average particle size of 500 nanometers to 200 micrometers.

19. The component of claim 18, wherein the plurality of particles comprising metal bonded to the surface of the substrate have an average particle size of 100 nanometers to 5 micrometers.

20. The component of claim 1, wherein the plurality of particles comprising metal bonded to the surface of the substrate have an average particle size of 100 nanometers to 5 micrometers.

\* \* \* \* \*